US006785272B1

(12) United States Patent
Sugihara

(10) Patent No.: US 6,785,272 B1
(45) Date of Patent: *Aug. 31, 2004

(54) INTELLIGENT STACKED SWITCHING SYSTEM

(75) Inventor: Tomoyuki Sugihara, Kanagawa-ken (JP)

(73) Assignee: Allied Telesyn, Inc., Bothell, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/339,729

(22) Filed: Jun. 24, 1999

(51) Int. Cl.[7] .............................................. H04L 12/12
(52) U.S. Cl. ...................................... 370/386; 370/400
(58) Field of Search ......................... 370/360, 364–365, 370/389, 400–408, 367–388

(56) References Cited

U.S. PATENT DOCUMENTS

| | | | |
|---|---|---|---|
| 4,674,085 A | | 6/1987 | Aranguren et al. ............ 370/85 |
| 5,079,766 A | | 1/1992 | Richard et al. ............ 370/85.3 |
| 5,115,235 A | | 5/1992 | Oliver ................... 340/825.52 |
| 5,189,414 A | | 2/1993 | Tawara .................... 340/825.5 |
| 5,265,123 A | | 11/1993 | Vijeh et al. ...................... 375/3 |
| 5,430,762 A | | 7/1995 | Vijeh et al. .................. 375/211 |
| 5,444,694 A | * | 8/1995 | Millet et al. ................. 370/224 |
| 5,491,689 A | * | 2/1996 | Maher et al. ................. 370/312 |
| 5,629,685 A | | 5/1997 | Allen et al. ............ 340/825.02 |
| 5,651,003 A | | 7/1997 | Pearce et al. ................ 370/395 |
| 5,742,603 A | | 4/1998 | Shafir et al. ................. 370/401 |
| 5,751,710 A | * | 5/1998 | Crowther et al. ........... 370/423 |
| 5,764,638 A | | 6/1998 | Ketchum .................... 370/401 |
| 5,802,333 A | * | 9/1998 | Melvin ....................... 710/316 |
| 5,875,314 A | * | 2/1999 | Edholm ...................... 710/317 |
| 5,892,932 A | * | 4/1999 | Kim ............................ 710/316 |
| 6,044,121 A | * | 3/2000 | Nolan et al. ................ 375/354 |

OTHER PUBLICATIONS

Huang, "Single Switch Image for a Stack of Switches", US patent Application Publication No. US 2002/0046271 A1, Apr. 18, 2002.*

Hickman et al., "Link Aggregation Control for Network Devices", US patent application Publication No. 2002/0110148 A1, Aug. 15, 2002.*

O'Callaghan et al., "Network Switch with Mutually Coupled Look-up Engine and Network Processor", US patent application Publication No. US 2002/0101867 A1, Aug. 1, 2002.*

(List continued on next page.)

Primary Examiner—Chi Pham
(74) Attorney, Agent, or Firm—Cooley Godward LLP

(57) ABSTRACT

The present invention is directed to an apparatus and a method of controlling a stacked switching system. The stacked switching system according to the present invention has a plurality of switches connected to each other through a network backplane. One of the switches in the stacked system is designated as the master unit, whereas the remaining switches are designated as the slave units. The present invention discloses two topology designs for assigning the master duties among the plurality of switches. The first topology design is termed as a fixed topology and the second topology design is termed as a dynamic topology. Both of these two topology designs assign the master control to the switch having the highest priority index. This master duties assignment is performed whenever there is a deletion or addition of switching unit to the system. For the fixed topology design, the master control assignment can only be performed after rebooting the system. On the other hand, for the dynamic topology design, the master control assignment can be performed "on-the-fly" which means the master control assignment can be performed without the need of rebooting the system.

10 Claims, 10 Drawing Sheets

OTHER PUBLICATIONS

Tzeng, "Linked Network Switch Configuration", US patent application Publication No. US 2002/0085586 A1, Jul. 4, 2002.*

Ambe et al., "Method and Apparatus for Enabling L3 Switching by A Network Switch In A Stacking Enviroment", US patent application Publication No. US 2002/0057685 A1, May 16, 2002.*

Ambe et al., "Gigabit Switch Supporting Improved Layer 3 Switching", US patent application Publication No. US 2002/0018489 A1, Feb. 14, 2002.*

* cited by examiner

INTELLIGENT STACKED SWITCHING SYSTEM

BACKGROUND OF THE INVENTION

The present invention relates to a computer network architecture for switching data between individual input and destination resources. More specifically, the present invention discloses an apparatus and a method of controlling a plurality of switches connected together as a single stacked switching system.

A conventional switching system for interconnecting and switching data between a plurality of input/destination resources, e.g., computer terminals, represents a rapidly developing area of technology. However, as the number of input/destination resources increases, the number of ports supported by a single switch can no longer handle the network traffic needs of a modern system. In addition, with the proliferation of the modern virtual local area network ("VLAN") environment, the need for an economic high performance switching system capable of handling increasingly higher numbers of user and/or workgroups is increased.

Ethernet switches first appeared in 1991 when Kalpana (™) launched the original ethernet switch. From an ethernet perspective, however, switches are really just multiport bridges that have been around for many years. Technically, bridging is an OSI Layer 2 function, and all of today's common networking standards—such as the three different ethernet standards, token ring, FDDI, and so on—can all be bridged. What differentiate today's switches from yesterday's bridges are the features and the uses of these modern multiport bridges.

A few years ago, two-port ethernet bridges were used to connect two different local area networks ("LANs") together. Then vendors started building intelligent multiport bridges, which are essentially a number of two-port bridges connected together. Today, these multiport bridges have been enhanced and are called switches. These switches are now used within an existing network to disconnect or segment a larger LAN into many smaller ones.

On the other hand, a repeater is a network device that indiscriminately regenerates and forwards a received ethernet frame, whether it's good or bad. Repeaters are known as passive, or shared, components of the network because they do not logically act on incoming frames. Repeaters just regenerate incoming signals, thus extending the diameter of the network. In this way, repeaters are invisible to network events such as collisions or errors, merely propagating them along. Hence, a repeater cannot extend the collision domain of a network. In other words, repeaters simply enlarge an existing network.

Quite differently, bridges connect different ethernet LANs. More specifically, bridges perform basic frame filtering functions before retransmitting the incoming frame. Whereas repeaters forward all frames, a bridge forwards only those frames that are necessary. If a frame does not need to be forwarded, the bridge filters it out.

For example, a bridge can be used to eliminate unnecessary network traffic from an ethernet LAN to another ethernet LAN by screening the traffic. Bridges also do speed matching: Regular 10 Mbps ethernet and 100 Mbps fast ethernet can only be connected by means of a bridge.

Specifically, every ethernet frame has two fields defined as the destination and source address. These two fields tell a bridge where a frame is originated and where it is ultimately destined. Bridges look at an incoming ethernet frame and analyze the destination address defined in the frame's header. From this information, the bridge can check its internal memory for past frames and determine whether to forward the frame to another port or filter it out—that is, do nothing and discard the frame. In this way, bridges can isolate network traffic between network segments. In some cases, bridges can also check for errors and don't forward damaged or incomplete frames.

A bridge works like a good postal mail delivery system. A bridge knows exactly where everyone within its served neighborhood resides. It delivers a piece of mail only to the intended recipient within its served neighborhood, looking at the address on every envelope and delivering the envelope to that particular address. If an envelop or frame is damaged or contains an error, a bridge mail system will not, delivery nor forward the mail to the intended recipients. Furthermore, if an envelop or frame indicates an address belonging to a neighborhood served by another bridge, the envelop or frame will be relayed to that bridge accordingly.

A repeater works very differently. A repeater mail system uses the brute-force approach to mail delivery. A repeater makes a copy of every piece of mail it receives, then delivers a copy to you and everyone in your neighborhood. Everyone in the neighborhood gets not only his or her own mail but also copies of everyone else's mail.

A stackable repeater can be thought of as a repeater with an expansion option. A stackable repeater consists of several independent units, each with a given number of ports. Each unit acts as a standalone repeater in its own right, but also has an external connection for adding additional units exactly like itself. Because stackable repeaters are shared-media devices, the effective bandwidth for a stack of hubs is always the same, no matter how many ports are in the stack. The more ports that are added, the less average bandwidth available to any given port.

The stackable repeater's upgradability and inexpensive cost per port combine to make it the fastest growing segment of the entire hub market. Stackable repeaters allow LAN administrators to purchase a single management unit to manage the whole stack, and thereby distribute the management costs over many ports. Stackable repeaters are also extremely useful in connecting many nodes on an ethernet network due to the associated network diameter restrictions.

Stackable repeaters are analogous to multiple standalone repeaters linked together with a high-speed stacking bus, yet sharing the same collision domain. This makes the stacked repeater look to the rest of the network like essentially one large repeater. Stackable repeaters are currently quite popular in 10 BASE-T, and newer 10/100 versions.

Stackable repeaters are becoming popular because they offer multiple connections at a low cost per port, they are manageable and easy to upgrade, and they fit well within the typical hierarchical network structure of large LANs.

As network traffic grows, a new switch design is required to accommodate the increasing number of ports connected to a switch. Attempts have been made to combine a plurality of switches to form a stacked switching system. However, because of the complexity in handling the stacked management functions, it has been very difficult to combine multiple switches into a stacked switching system. There are currently some stackable switches available in the market, however, most of these stackable switches require a dedicated system management unit to coordinate various switches in the stacked system. In some conventional designs, this dedicated system management unit is a separate hardware component loaded with stacked management software/firmware. By connecting this system management unit to each of the switch units in the stacked switching system, the system management unit acts as a master control of the stacked system. However, these separate system management units tremendously increase the cost and physical dimension of the stacked switching system. Thus, a new method of combining a plurality of switches together in forming a new stacked switching system as disclosed in the present invention is desired.

SUMMARY OF THE INVENTION

It is therefore an object of the present invention to provide a method of connecting a plurality of switching units.

It is another object of the present invention to combine a plurality of switching units to form a stacked switching system.

It is yet another object of the present invention to provide a flexible control to the switches connected as a stacked switching system.

It is a further object of the present invention to provide a number of design topologies for controlling a stacked switching system.

The present invention discloses an apparatus and a method of controlling a stacked switching system. The stacked switching system according to the present invention comprises a plurality of switches connected to each other through a network backplane. One of the switches in the stacked system is designated as the master unit, whereas the remaining switches are designated as the slave units. The present invention discloses two topology designs to assign the master duties among the plurality of switches. The first topology design is termed as a fixed topology and the second topology design is termed as a dynamic topology. Both of these two topology designs assign the master control to the switch having the highest priority index. The assignment of this master control is performed whenever there is a change of topology in the system such as the deletion or addition of switching unit to the system. For the fixed topology design, the master control assignment can only be performed after rebooting the system. On the other hand, for the dynamic topology design, the master control assignment can be performed "on-the-fly" which means the master control assignment can be performed without the need of rebooting the system.

Additional objects, features and advantages of various aspects of the present invention will become apparent from the following description of its preferred embodiments, which description should be taken in conjunction with the accompanying drawings.

DETAILED DESCRIPTIONS OF THE DRAWINGS

Figure 1:
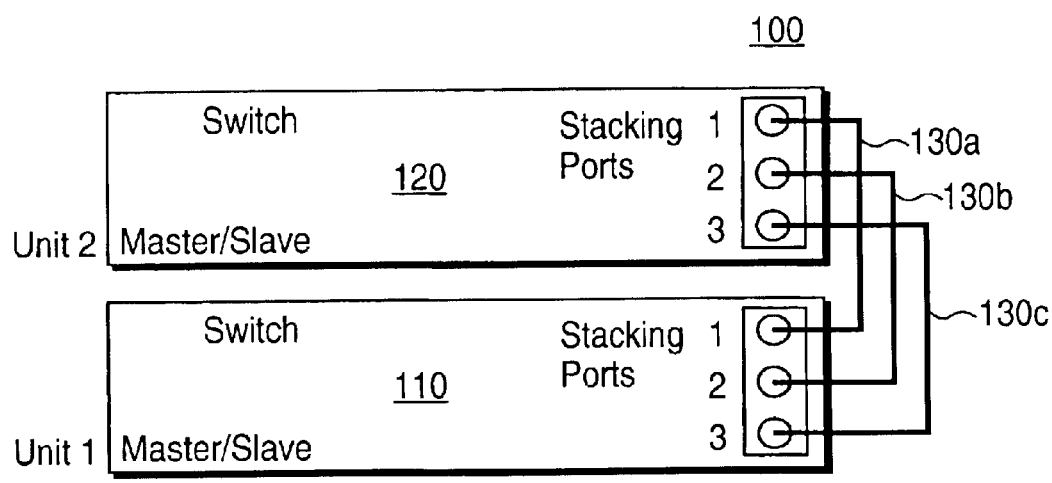
FIG. 1 shows one embodiment of the stacked switching system according to the present invention.

According to the present invention, a stacked switching architecture is described. A plurality of switch units are connected as a stacked switching system which includes a master unit and a plurality of slave units. In the preferred embodiment, each of the switch units is similar in design and is connected to each other through stacking links. Furthermore, the present invention discloses two design methodologies in connecting the switch units: fixed topology and dynamic topology.

In the fixed topology, one of the switch units is designated as the master unit after system bootup. The master unit is assigned the highest priority index among all connected switch units. During the system bootup, each of the units sends its own priority index to other units for comparison. Upon receiving the priority indexes of all the other units, each of the units determines whether it has the highest priority index. The unit having the highest priority index becomes the master unit of the system, whereas all remaining units become the slave units. The specific duties of the master unit will be described in detail in the following paragraphs. Furthermore, in the fixed topology, any topology changes will require rebooting of the entire system and/or each of the units connected. By rebooting the system, a new master unit is elected. The new elected master unit will then determine the characteristics of the stacked system, and create the topology tables for stacking and spanning tree protocol, etc.

In the dynamic topology design according to the present invention, the stacked switching system is able to adjust to the changes of topology without the need of rebooting the system. Specifically, each of the current master and slave units is not required to reboot itself for the reassignment of the master-slave relationship. For example, when a new unit having a higher priority than the current master unit is added to the system, the system will reassign the newly added unit to be the new master unit without the need to reboot the system. The current master unit will simply "yield" the master control to the new master unit without rebooting the system.

Because of this feature of being able to change the system topology "on-the-fly", the dynamic topology system provides tremendous flexibility in the system design without being penalized by rebooting the system.

In the preferred embodiment, the stacked switching system is a master-slave switching system comprising a plurality of switching units. One of the switching units is designated as a master unit and each of the remaining ones is designated as a slave unit. The master unit is responsible for performing stacking management functions among all the units. In addition, the master unit is responsible for communicating with the SNMP manager, such as responding to any SNMP commands and returning the corresponding values to the SNMP manager through the SNMP agent, etc. Furthermore, the master unit is also responsible for creating, maintaining and updating the controlling topology among all the units.

In general, the master unit is responsible for the following functions: (1) managing the stacked switching system; (2) handling the SNMP requests; and (3) maintaining the topology orientation of the system.

In the fixed topology, first, the master unit is responsible for detecting whether there are any slaves unit attached to the system. If there is at least one slave unit attached to the stacked system, the master unit is responsible for creating a topology table for the stacked system, and responsible for updating the topology discoveries to all units in the system. In addition, the master unit is responsible for initializing each port controller in all units of the system, including both the master unit and the slave unit(s). Furthermore, the master unit is responsible for setting up a static forwarding table(s) to support the stacking links between the master unit and slave unit(s).

In case that any unit(s) in the stacked switching system is loaded with a different version of the firmware than the master unit, the master unit will download its own firmware to each of the slave unit(s) in order to ensure each unit in the system is running on an identical version of firmware. In the preferred embodiment, the firmware comprises various sets of programming codes for controlling the stacking functions, interfacing with other stacked units (e.g. master unit and other slave units), and controlling individual ports in each unit to communicate with different resources, etc. One example of the organization of the firmware will be illustrated in FIG. 5 of this specification.

In the dynamic topology design according to the present invention, the master unit is also responsible for all duties as stated above as in the fixed topology. However, since it is a dynamic topology design, the switching between master duties from a current master unit to a next master unit will be performed "on-the-fly" without the need of rebooting the system. By dynamically changing the topology of the system, it eliminates the downtime of the system caused by the additions and/or deletions of units.

In the fixed topology design, the topology among various units in the system cannot be changed unless the entire system is shut down and rebooted. In other words, when a new unit having a higher priority index than the master unit is introduced in the system, the system is required to reboot so that (1) the current master unit can relinquish its control over all slaves; and (2) the new master unit can take over the control of the system and become the new host unit.

It should be noted that the fixed topology of the present invention requires only simple firmware control, and thus provides a simpler system. However, the disadvantage of the fixed topology design is the requirement of rebooting the system when there is a topology change in the system (e.g. deletion or addition of unit(s)).

FIG. 1 shows one embodiment of the stacked switching system 100 according to the present invention. As shown in the figure, the preferred system comprises one master unit 110 and one slave unit 120. In this specific design, the slave unit 120 is connected to the current master unit 110 through three stacking links 130*a*, 130*b*, 130*c*. Each of these three stacking links 130*a*, 130*b*, 130*c* is connected to the respective stacking port of the master unit 110 and the slave unit 120. In the example as shown, unit 1 110 is the current master unit which is responsible for all master functions, whereas unit 2 120 is the slave unit which is basically a passive unit. As stated above, the master unit 110 and the slave unit 120 are connected by three stacking links 130*a*, 130*b*, 130*c* for the communications between these two units 110,120. These three stacking links 130*a*, 130*b*, 130*c* act as a communication backplane of the stacked switching system. It should be noted that the number of the stacking links between various units depends on the communication volume between these two units. The number can be changed depending on the design and actual needs. In the preferred embodiment, a console screen (not shown) is connected to the master unit for user interfacing.

In the preferred embodiment, the user of the stacked switching system designates the priority index of each unit. By setting the priority index of each unit, the master-slave designation will be assigned based on the designated priority indexes during the initial bootup of the system.

According to the fixed topology design of the present invention, if power is removed from one or more units in a functioning stacked switching system, the remaining units will be reset and rebooted before performing the master election process. If another unit is later reconnected to the stacked system, the system will again automatically reset so that all the units in the system will again elect a new master unit of the system. This new master unit election process can also be called the "auto-topology" design, and will be described in detail in the following paragraphs.

In the dynamic topology design according to the present invention, the same new master unit election process is also performed when (1) new unit(s) is connected to the stacked system; and (2) existing unit(s) is removed from the stacked system, etc. However, according to the dynamic topology design, the new master unit election process is performed "on-the-fly" without the need of rebooting the system. This is the main difference between the fixed topology design and the dynamic topology design of the present invention.

As stated in the previous paragraphs, another feature of the present invention is the master unit election process design (called the auto-topology design). This aspect of the present invention supports a stacked switching system having any number of switching units connected together. In the preferred embodiment, in the master unit election process, the unit having the highest priority index will be elected as the current master unit. The current master unit will be assigned all the master duties of the system. As described in the previous paragraphs, each of the units is assigned a distinct priority index before booting up the system. In the preferred embodiment, the priority indexes can be assigned by the user based on objective requirements such as network traffic expected on that particular unit, or the physical connections between each of the units in the system.

During the system bootup, all units in the stacked switching system will enter into a master unit election process to determine the master and slave unit(s) assignments. In one embodiment of the present invention, the election process runs periodically, and/or whenever there is an addition or deletion of unit in the system. For example, when the current master unit looses power or is removed from the stack, a new master unit will be elected among all the remaining units. On the other hand, when a new unit is connected to the system, the new unit will replace the current master unit as the new master unit if the new unit has a higher priority index than the current master unit. It should be noted that, in the dynamic topology design, all these topology changes are performed "on-the-fly" without the need of rebooting the entire system.

Figure 2:
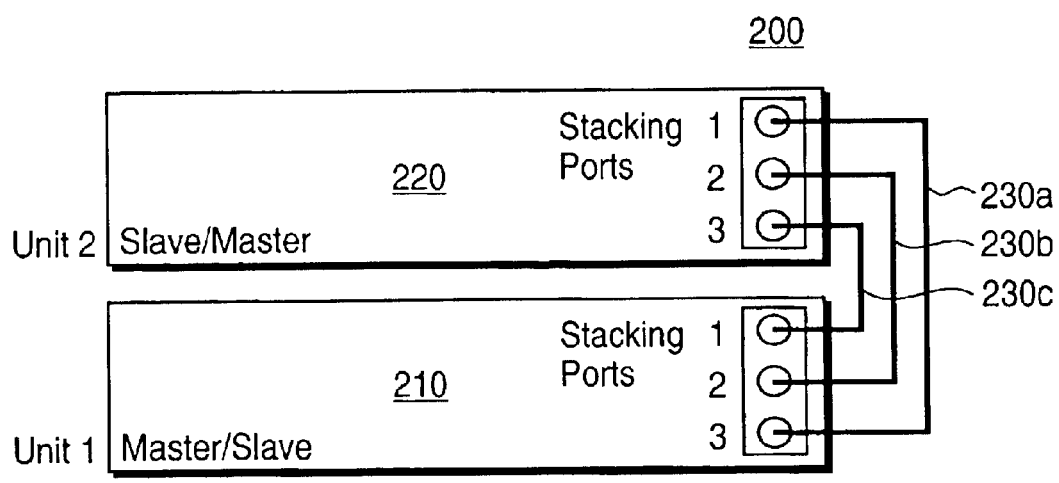
FIG. 2 shows a preferred embodiment of a switching unit employing the dynamic topology design according to the present invention.

FIG. 2 shows another preferred embodiment of a stacked switching system 200 employing the dynamic topology design according to the present invention. The stacked switching system 200 as shown comprises two stacked units: Unit 1 210, and Unit 2 220. It should be noted that the arrangement of the two stacked switching Units 210,220 as shown in FIG. 2 is similar to the embodiment as shown in FIG. 1, except the stacking links are connected differently between Unit 1 210, and Unit 2 220. In the preferred embodiment as shown in FIG. 2, Unit 1 210 is the current master unit, whereas Unit 2 220 is the slave unit. The difference between this dynamic topology design and the fixed topology design as shown in FIG. 1 is that, according to this dynamic topology design, when a new master unit (not shown) is connected to the stacked switching system 200, the master duty currently held by the current master unit (i.e. Unit 1 210) will be automatically transferred to the new master unit.

It should be noted that the preferred embodiment as shown in FIG. 2 can be used for both the fixed topology design and the dynamic topology design according to the present invention.

In the dynamic topology design, the reassignment of the master duty to the new master unit is performed by the stacked switching system without the need of rebooting the system. Specifically, upon detecting the addition of a new master unit, all the switching units connected in the system (i.e. Unit 1, Unit 2, and the new master unit not shown in the figure) will perform the master unit election procedure and the new master unit will be elected. The entire master unit election procedure and the subsequent reassignment of the new master unit are performed "on the fly." It should also be pointed out that, during the assignment process, the new master unit creates a new topology table, and performs other miscellaneous operations.

On the other hand, in the fixed topology design, the same master duty reassignment process can only be performed after rebooting the entire system.

Figure 3:
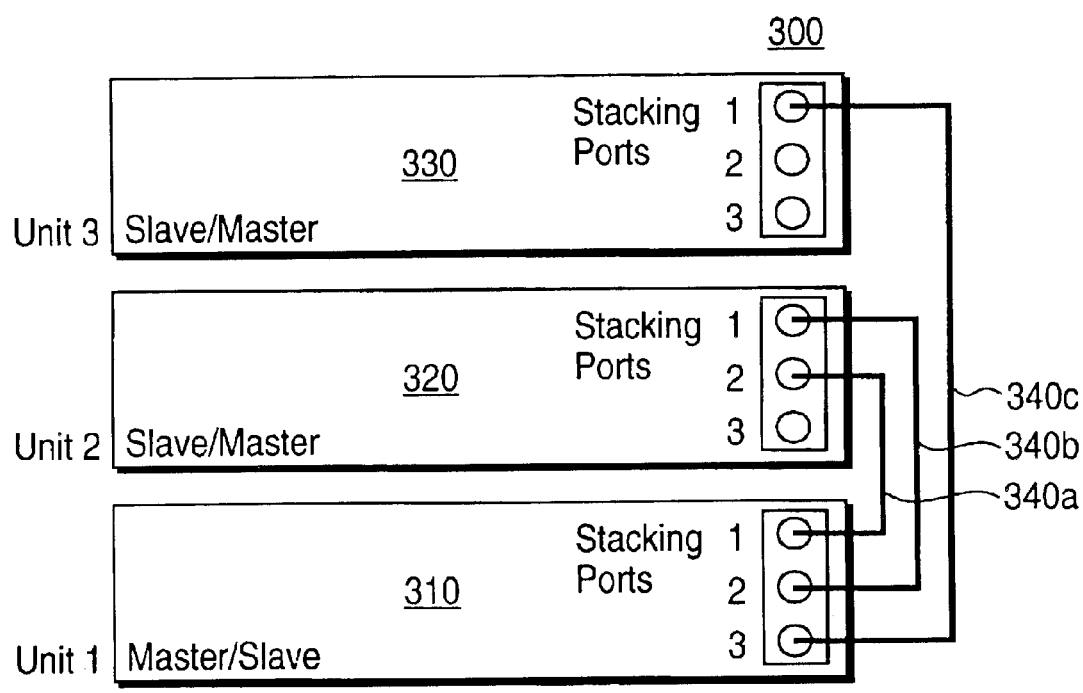
FIG. 3 shows another embodiment according to the present invention having three stacked switching units in the system.

FIG. 3 shows another embodiment according to the present invention. The stacked switching system 300 as shown comprises three stacked switching units (i.e. Unit 1, Unit 2, and Unit 3). As shown in the figure, Unit 1 310 is the switching unit having the highest priority number (i.e. 1) whereas Unit 2 320 and Unit 3 330 have the second and third highest priority numbers respectively (i.e. 2, 3). Thus, after the master unit election process, Unit 1 310 is assigned as the current master unit for the system. Unit 2 320 and Unit 3 330 are assigned as the slave units (i.e. first slave unit, second slave unit) of the system. FIG. 3 shows that there are two stacking links 340a,340b connecting the master unit (i.e. Unit 1 310) and the first slave unit (i.e. Unit 2 320). In addition, there is one stacking link 340c connecting the master unit (i.e. Unit 1 310) and the second slave unit (i.e. Unit 3 330). It should also be noted that, in another embodiment not shown, there can be another stacking link connecting between port 3 of the first slave unit (i.e. Unit 2 320) and either port 2 or 3 of the second slave unit (i.e. Unit 3 330). These two redundant connections can be used for handling the additional data communication between the two slave units.

It should be noted again the preferred embodiment as shown in FIG. 3 can be used for both the fixed topology design and the dynamic topology design.

Figure 4:
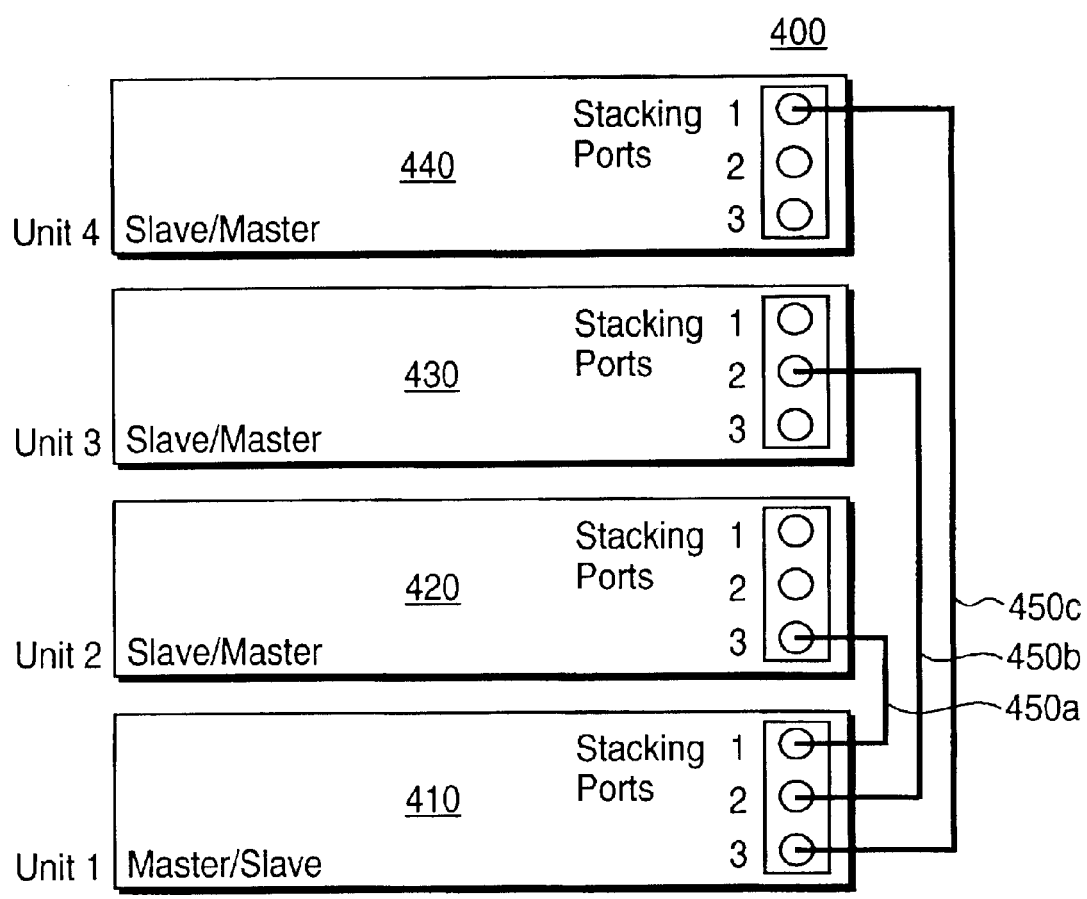
FIG. 4 shows yet another embodiment according to the present invention employing this dynamic topology design.

FIG. 4 shows yet another embodiment according to the present invention employing either the fixed topology design or the dynamic topology design according to the present invention. The stacked switching system 400 as shown comprises 4 stacked switching units (i.e. Unit 1 410, Unit 2 420, Unit 3 430 and Unit 4 440). In this example, these four units are assigned with priority numbers 1, 2, 3, 4 respectively. Based on the assigned priority numbers, Unit 1 410 will be designated as the master for this stacked system, and Unit 2 420, Unit 3 430, and Unit 4 440 will be designated as the slaves for this system in the master election process. As shown in the figure, port 1 of the master unit (i.e. Unit 1 410) is connected to port 3 of Unit 2 420. Port 2 of the master unit (i.e. Unit 1 410) is connected to port 2 of Unit 3 430. And finally, port 3 of the master unit (i.e. Unit 1 410) is connected to port 1 of Unit 4 440. It should be noted that this stacking connection basically establishes a "star" network system which the master unit (i.e. Unit 1 410) serves as the center of the stacked switching system. However, for network performance and redundancy purposes, each of the slave units as shown in the figure can also be connected between the unused port (e.g. ports 1 and 2 of Unit 2 420, ports 1 and 3 of Unit 3 430, and ports 2 and 3 of Unit 4 440). By connecting these three slave units (i.e. Unit 2 420, Unit 3 430, Unit 4 440), one of these three units can take over as the new master unit when the current master unit (i.e. Unit 1 410) is removed from the system or down. In that case, because Unit 2 420 has the highest priority assignment among all remaining units, Unit 2 420 will take over as the new master unit when the current master unit (i.e. Unit 1 410) is removed from the stacked switching system 400. Since the stacked switching system 400 as shown is designed under the dynamic topology according to the present invention, the master control will be shifted from the dying current master unit (i.e. Unit 1 410) to the new master unit (i.e. Unit 2 420) on-the-fly (i.e. without the need of rebooting the system). Particularly, this means that the transfer of the control from the current master unit (i.e. Unit 1 410) to the new master unit (i.e. Unit 2 420) will be transparent to all the connecting ports because the functionality of the stacked system 400 will be maintained during the transfer of the master duties.

As stated in the previous paragraphs, the main advantage of this dynamic topology design is to allow addition and/or deletion of switching units to and from the system without the need to shut down the system for rebooting. This creates tremendous flexibility in system design for the user.

Figure 5:
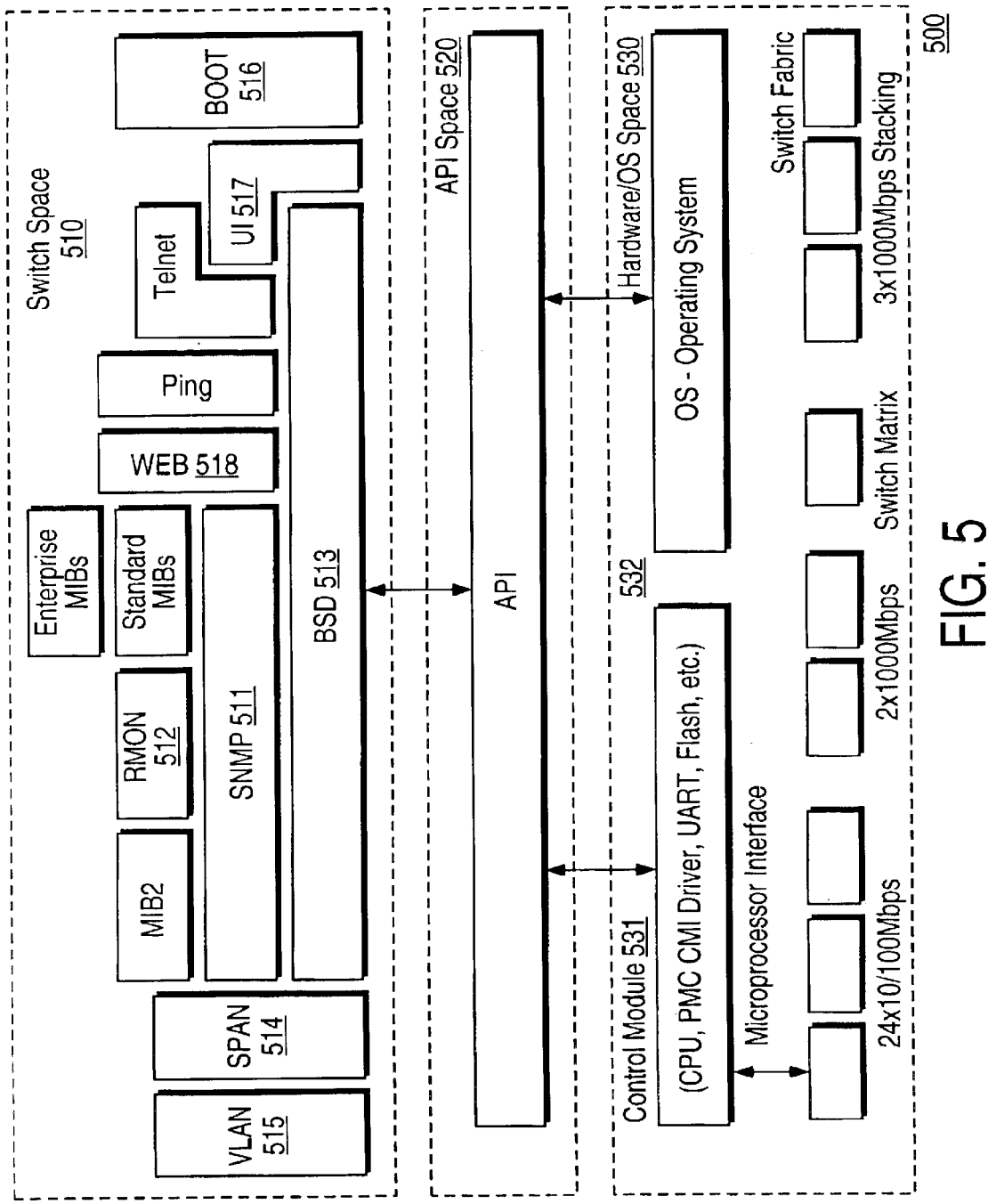
FIG. 5 is a block diagram of a preferred embodiment of the firmware architecture used in the stacked switching system according to the present invention.

FIG. 5 is a block diagram of a preferred embodiment of the firmware architecture 500 used in the stacked switching system according to the present invention. As shown in the figure, the software system as shown comprises three levels: a switch space SWITCH 510, an interface space API 520, and a hardware/OS space 530.

In the first level, the firmware system comprises the switch space SWITCH 510 for handling the basic switching functions in each switching unit. This level comprises a SNMP agent 511 for supporting the standard SNMP management information base ("MIB"), it can also supports additional standard and enterprise MIBs; a remote monitoring group MIB engine RMON 512 for maintaining RMONs; a BSD lite derivative module BSD 513 for supporting TCP/IP, IP, UDP, ARP, ICMP and other protocols, this fully functional BSD stack includes complete BSD run-time library support for a complete embedded network development environment; a spanning tree module SPAN 514 for supporting bridge MIB spanning tree protocol; a 802 1 Q VLAN, module VLAN 515 for supporting GARP, GVRP and GMRP protocols plus legacy port-base VLAN support; a bootstrap module BOOT 516 for supporting power on self test, processor diagnostic, and stacking firmware, etc.; a user interface module UI 517 for handling full screen extensible ASCII forms-based interface; and a web module WEB 518 for supporting a complete set of HTML pages for accessing and controlling the switch.

The second level API 520 is a real-time operating system and hardware independent application interface for the stacked system. This level abstracts all hardware and operating system calls. It basically serves as an interface between the first level 510 and the third level 530.

The third level is the Hardware/OS space 530. This level mainly comprises two modules: operating system module 532 and control module 531. In this preferred embodiment, the operating system module 532 is used for controlling basic hardware functions in each of the switching units, whereas the control module 531 is responsible for the communication with the second level and the system controlling of all the nine ports in each of the units.

Figure 6:
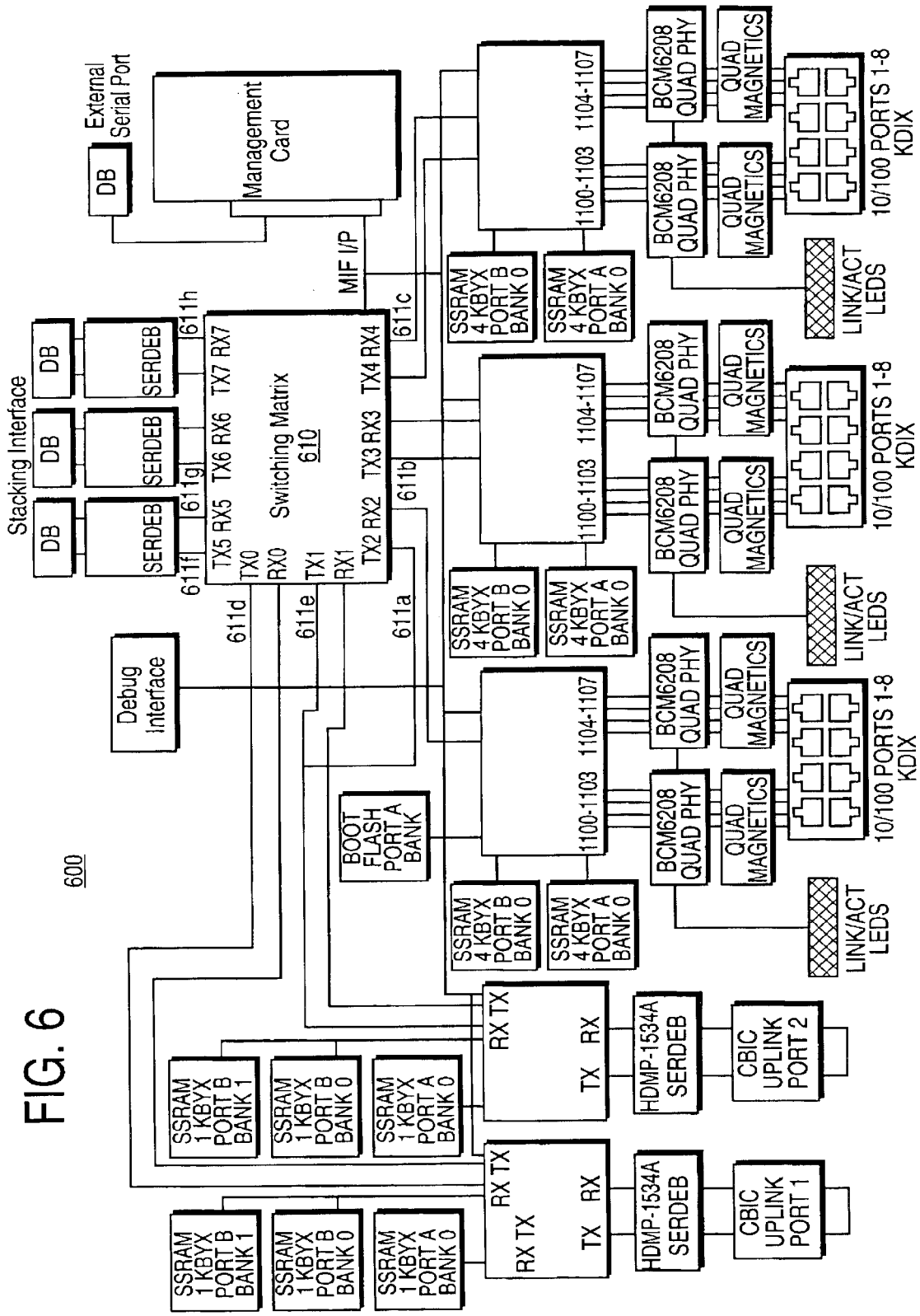
FIG. 6 shows a block diagram of a preferred embodiment of each of the switches according to the present invention.

FIG. 6 shows a block diagram of a preferred embodiment of each of the switches according to the present invention.

As shown in the figure, each switching unit 600 according to the present invention comprises a switching matrix 610 having eight bus ports 611*a,b,c,d,e,f,g,h*: In the preferred embodiment as shown, three of the eight bus ports are ethernet ports 611*a,b,c*, and two of the eight bus ports are gigabit uplink ports 611*d,e*. The remaining three bus ports 611*f,g,h* are reserved for the stacking links between switching units.

In the preferred embodiment, each of the three ethernet ports 611*a,b,c* supports eight ethernet ports 10 Base-T/100 Base-TX ethernet ports. Each of them has eight MII fast internet ports and connects to two quad magnetic devices. These quad magnetic devices are used for isolating the internet ports from the RJ45 connectors. In addition, each of these ethernet port controllers is supported by two separate memory ports for storing data management information such as address lookup data and input/output buffered data. Individual users can connect to the switching unit through any of these 24 ethernet ports. It should be noted that the present invention could be used in either the half-duplex or full-duplex connection. Further, in the preferred embodiment as shown, each of the two gigabit uplink ports 611*d,e* is responsible for gigabit uplink. As shown in the figure, each of these two gigabit uplink ports 611*d,e* is supported by three memory modules for storing address lookup data and buffered data packet.

As stated above, the remaining three ports 611*f,g,h* of the switching matrix 610 are specifically reserved for stacking purposes. By connecting one or more of these three ports 611*f,g,h* to the switching ports of a similar switching unit(s), a stacked switching system according to the present invention is created. The present design as shown also supports parallel stacking links so that aggregation of stacking links between two switching units is allowed. By aggregating multiple stacking links between two switching units, the overall network capacity between two units can be increased. For example, by combining two stacking links between two stacking units, the network capacity between these two units can be doubled. In the present design, because of the limitations of the number of the remaining ports (i.e. 3), the maximum stacking links aggregation between two ports is three.

However, in other design which has more than three remaining ports, the overall network capacity can be increased substantially.

Figure 7:
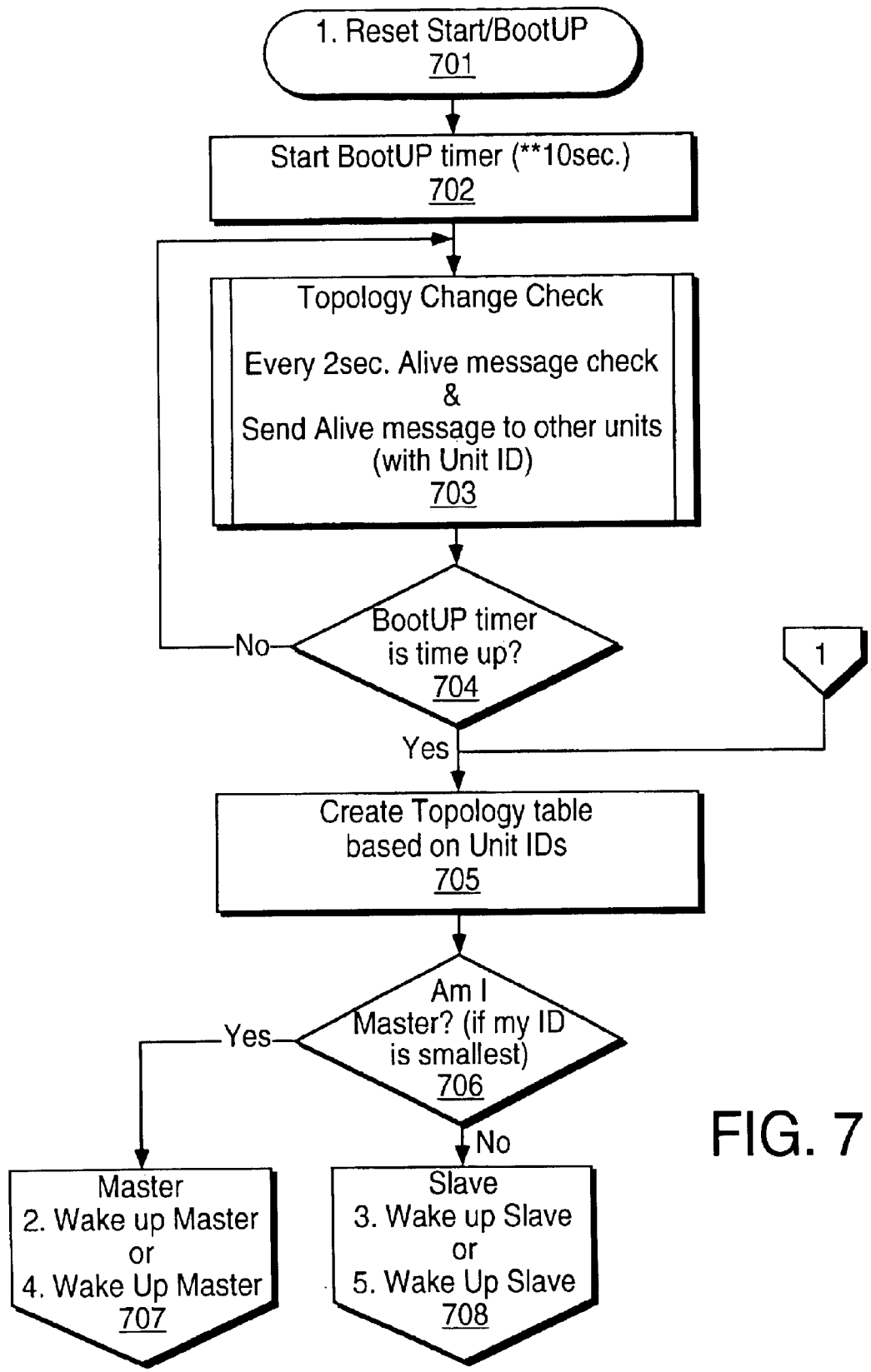
FIG. 7 is a flow chart showing a preferred embodiment of the bootup process in each switching unit according to the present invention.

FIG. 7 is a flow chart showing a preferred embodiment of the bootup process in each switching unit according to the present invention. Step 701 indicates the beginning of the bootup process. The process usually starts with the present switching unit being powered on. Then, in step 702, the present switching unit starts an internal timer for 10 seconds. In step 703, the present switching unit performs a check to determine whether any other switching unit is connected to the present switching unit by sending out an "ALIVE" message to inform all other units that this unit available and alive. According to the preferred embodiment, this ALIVE message also contains a unit ID of the present switching unit. The ALIVE message is continuously sent out every 2 seconds until every other unit receives this message and its accompanying unit ID. During this 10-second interval, each of the switching units connected to the present unit also listens to the network to determine whether there is any other unit connected to the system. The present switching unit then extracts all the units IDs from the alive messages sent by other switching units. By performing this "send and listen" process, each of the switching units connected to the system will have a complete profile of all other units connected to the system. In the preferred embodiment as shown, this "send and listen" process continues for 10 seconds. Thus, in step 704, a bootup timer is checked to determine whether the 10-second interval is up.

When the 10-second bootup time is over, each of the units will then create a topology table based on all information about other units connected to the system (Step 705). In Step 706, each of the switches then compares its own priority index with other units' priority index. Finally, the switching unit having the highest priority number will wake up as a master unit (Step 707). On the other hand, the remaining units will wake up as slave units (Step 708).

Figure 8:
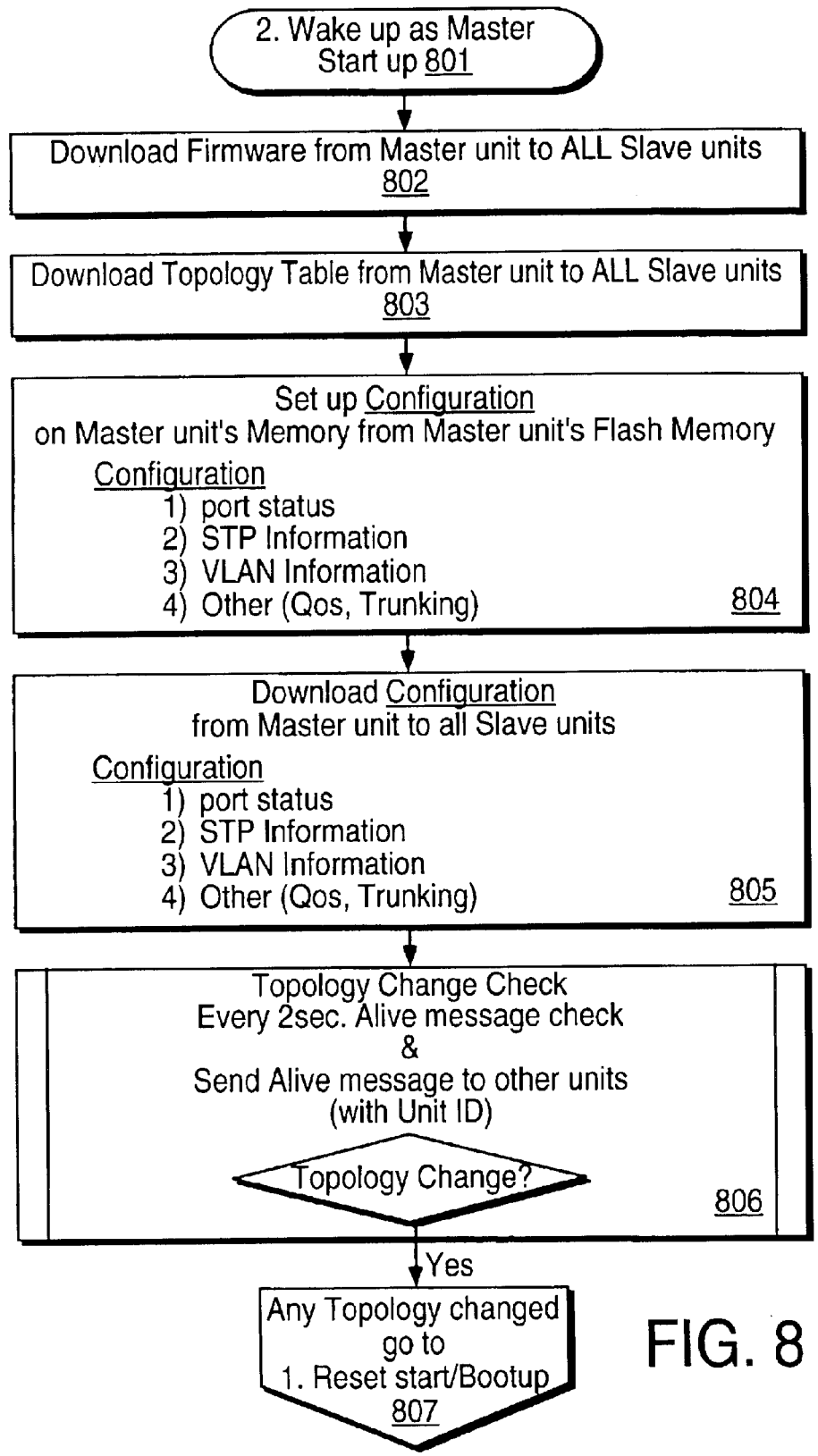
FIG. 8 is a flow chart showing the steps in a wake up process for a master unit in a fixed topology system according to the present invention.
Figure 9:
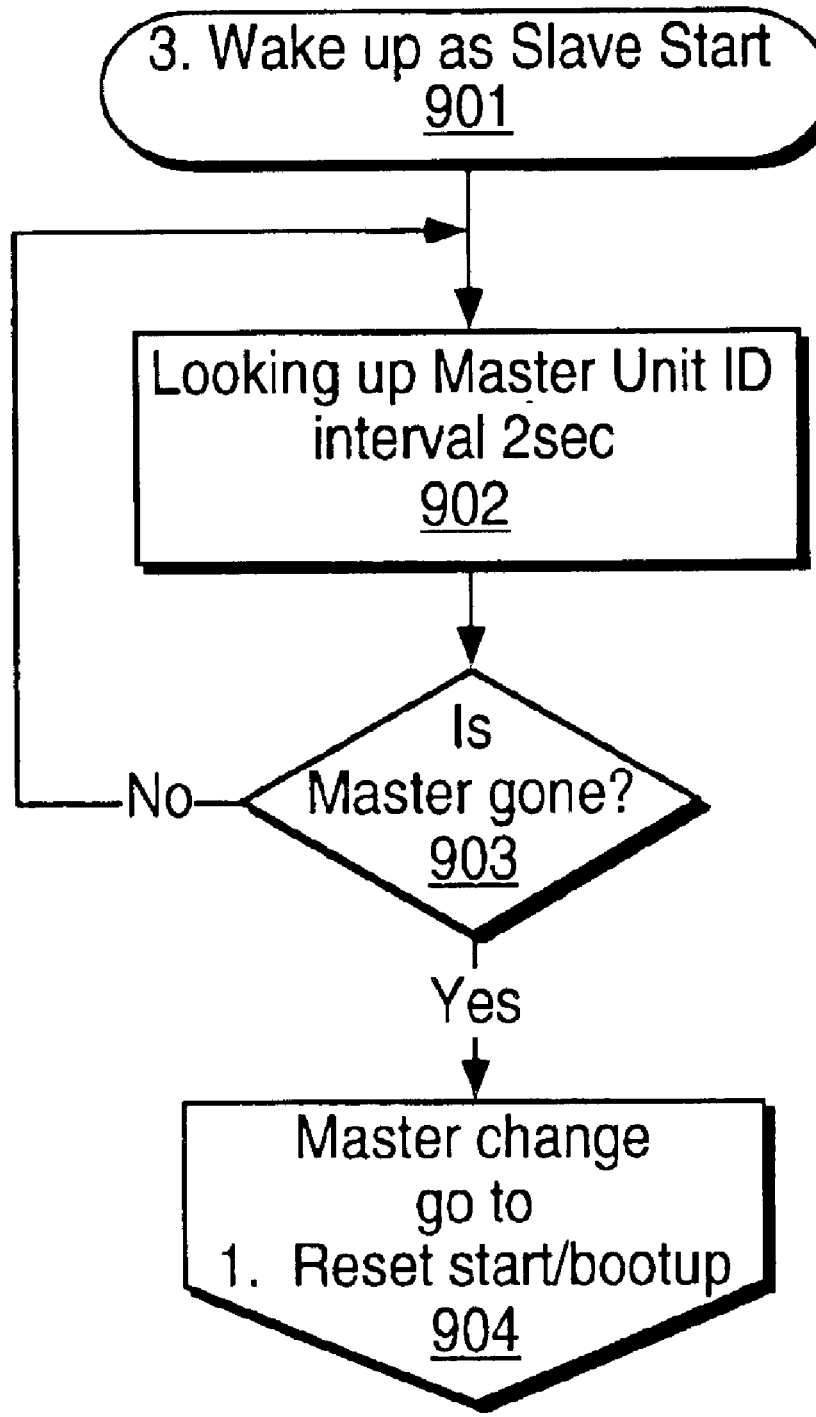
FIG. 9 is a flow chart showing the steps in a wake up process for a slave unit in a fixed topology system according to the present invention.

FIGS. 8 and 9 are directed to the fixed topology design according to the present invention. Specifically, FIG. 8 illustrates the process of waking up as a master unit in the fixed topology design, whereas FIG. 9 illustrates the process of waking up as a slave unit in the fixed topology design.

FIG. 8 is a flow chart showing the steps in a wake up process for a master unit in a fixed topology system according to the present invention. Step 801 indicates the beginning of the wake up process. In step 802, the master unit checks and determines whether each of the units in the stacked system contains the same version of the firmware. If any of the slave units does not possess the same version of the firmware as with the master unit, the master unit will download its own version of firmware to the slave unit in step 802. In step 803, after the topology table is created by the master unit, the master unit then downloads the topology table to each of the slave units connected. The topology table contains the topology arrangement between master unit and each of the slave units. In Step 804, the master unit then setups the configuration data and stores the configuration data into its own memory (preferably a non-volatile flash memory). The configuration data comprises, but is not limited to, port status of each port of each stacked switching unit; the spanning tree protocol ("STP") of the stacked units; VLAN information of each unit; and other information such as QOS data, COS data, and trunking data, etc. After the configuration data is setup by the master unit, the master downloads the configuration data to each of the slave units for backup purposes (Step 805).

After these initialization steps (i.e. steps 801–805) are finished, the master unit then goes into a detection procedure to detect any topology changes in the stacked switching system. Specifically, in Step 806, the master unit constantly determines whether there is any addition or deletion of units by listening to the network. This determination can be performed by detecting the alive message(s) sent by each of the switching unit(s) connected. For example, if there is a slave unit no longer sending out alive message, the master unit can assume that the slave unit is no longer connected to the stacked switching system. On the other hand, if there is an ALIVE message received along with a new unit ID, the master can conclude that a new switching unit is attached to the system. In either case, a new topology is required for the stacked switching system In the fixed topology design according to the present invention, the stacked system will return to the reset/bootup stage (Step 701 in FIG. 7) whenever there is a change in the topology (e.g. addition or deletion of units).

FIG. 9 is a flow chart showing the steps of a wake up process for a slave unit of the fixed topology design according to the present invention. Step 901 indicates the beginning of the slave unit wake up process. Then the slave unit goes into a loop to determine whether the current master unit is still in the system. This determination as shown in Step 902 is performed every two seconds. When the slave unit detects the current master unit is removed from the system, the slave unit returns to Step 701 in FIG. 7. On the other hand, if the master unit is still present in the system, the slave unit will continue this checking every two seconds. Similar to the master unit as shown in FIG. 9, the slave unit of a fixed topology design will return to the reset/bootup stage whenever there is an addition or deletion of unit in the stacked switching system. It should be noted that the slave unit also performs complementary steps (not shown in this flowchart) to the wake up process of the master unit as shown in FIG. 8. These complementary steps include, but are not limited to, receiving and updating the firmware, receiving and updating the topology tables, receiving and maintaining the configuration data, and responding to any master unit commands, etc.

Figure 10:
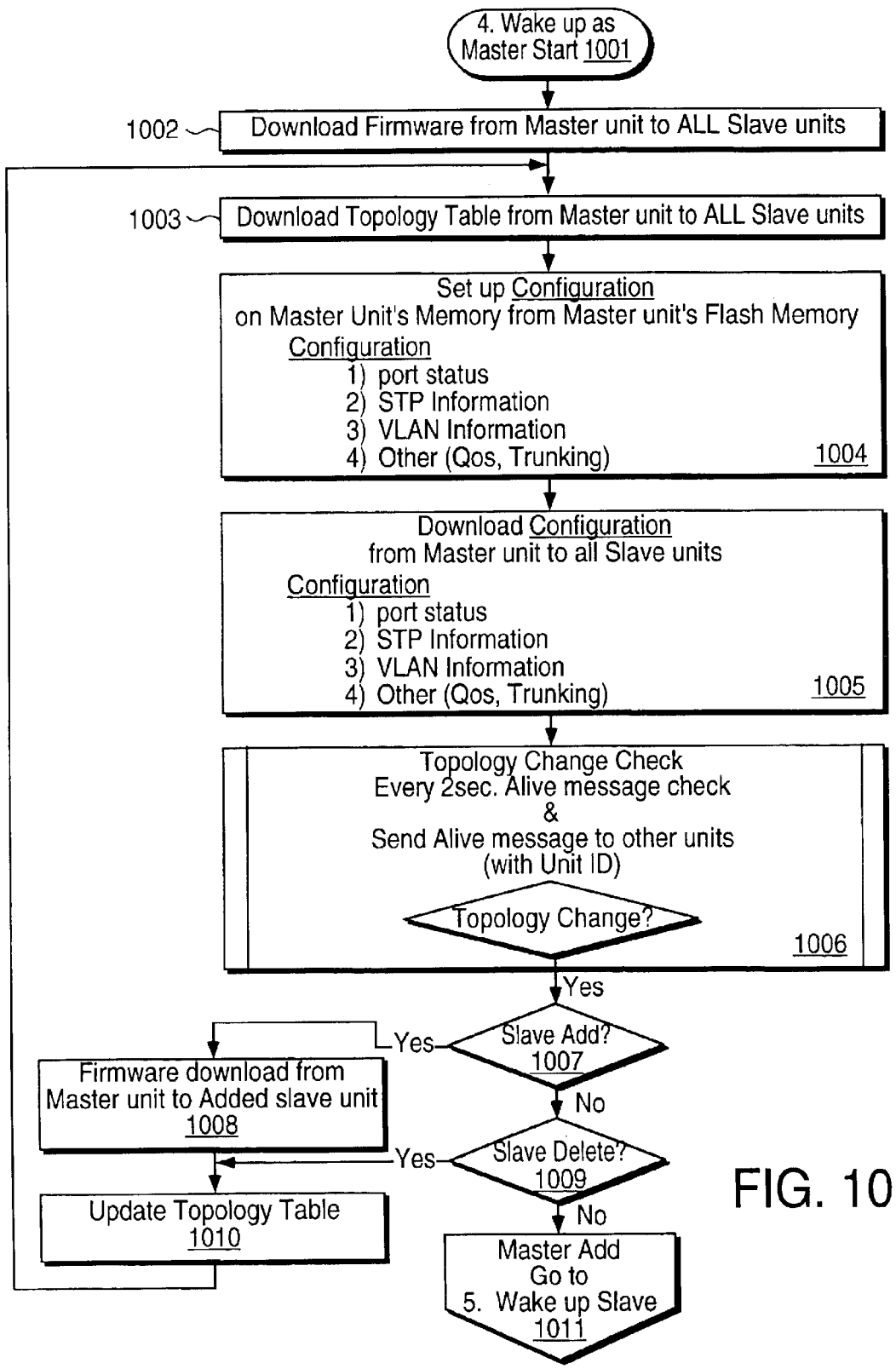
FIG. 10 is a flow chart showing the steps in a wake up process for a master unit in a dynamic topology system according to the present invention.
Figure 11:
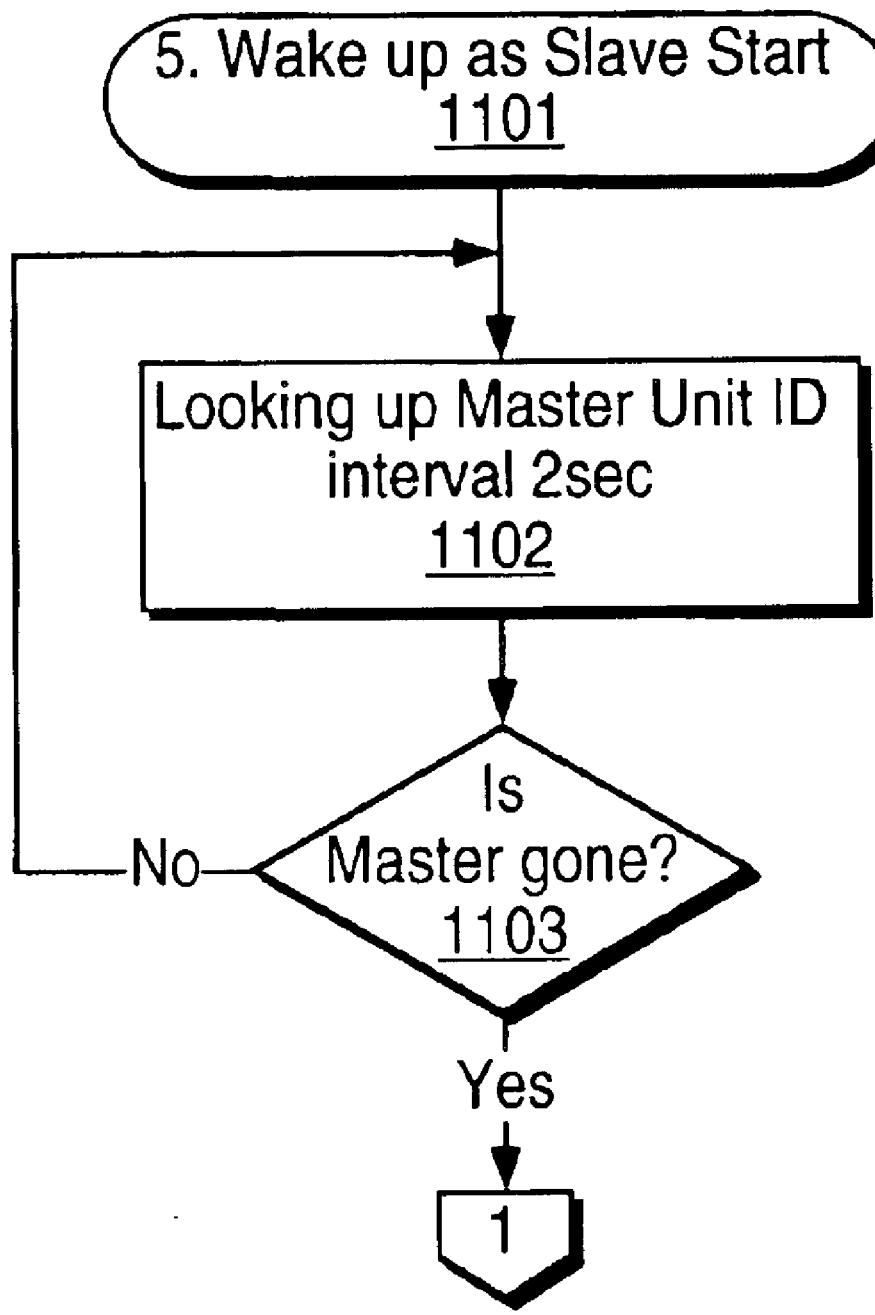
FIG. 11 is a flow chart showing the steps in a wake up process for a slave unit in a dynamic topology system according to the present invention.

FIGS. 10 and 11 are directed to the dynamic topology design according to the present invention. Specifically, FIG. 10 illustrates the process of waking up as a master unit for the dynamic topology design, whereas FIG. 11 illustrates the process of waking up as a slave unit in the dynamic topology design.

FIG. 10 is a flow chart showing the steps in a wake up process for a master unit in a dynamic topology system according to the present invention. Step 1001 indicates the beginning of the wake up process. In step 1002, the master unit checks and determines whether each of the slave units connected has the most updated version of firmware. If any of the slave units do not possess the same version of the firmware as the master unit, the master unit will download its own version of firmware to the slave unit in step 1002. In step 1003, the master unit then downloads the topology table to all of the slave units. The topology table contains the topology arrangement between the master unit and each of the slave units. In step 1004, the master unit then sets up the configuration data and stores those configuration data into its own memory (preferably a non-volatile flash memory). The configuration information comprises, but is not limited to, port status of each port of each stacked unit; the spanning tree protocol ("STP") of the stacked units; VLAN information of each unit; and other information such as QOS data, COS data, and trunking data, etc. After the configuration data is set up by the master unit, the master downloads the configuration data to each of the slave units for backup purposes (Step 1005).

After these initialization steps (i.e. steps 1001–1005) are finished, the master unit then goes into a detection procedure to detect any topology changes in the stacked switching system. Specifically, in Step 1606, the master unit constantly determines whether there is any addition or deletion of units in the system by listening to the network. This determination can be performed by detecting the ALIVE message(s) sent by each of the slave unit(s) connected to the master. For example, if there is one slave unit no longer sending out an ALIVE message, the master unit can assume that the corresponding slave unit is no longer connected to the stacked system. On the other hand, if there is an ALIVE message received along with a new unit ID, the master unit can conclude that a new switching unit is attached to the system. In either case, a new topology is required for the stacked switching system.

In the dynamic topology design according to the present invention, the master unit then decides whether there is any new slave unit added to the system (Step 1007). The detection can be made by first detecting any new unit ID. If there is a new unit ID received, the master unit then compares the corresponding priority index of the added unit to the priority index of the current master unit. If the priority index of the added system is lower than the priority index of the current master unit, the added, switching unit is a slave unit. If the added system is a slave unit, the master unit will then update the firmware of this added unit (if needed) in step 1008. Then, in Step 1010, the topology table will be updated accordingly to reflect the addition of this slave unit. On the other hand, if the master unit cannot receive the ALIVE message from one slave unit, the master unit will assume that the corresponding slave unit is deleted from the stacked system. In this case, the master unit will then update its topology table by deleting this missing slave unit. After updating the topology table, the master unit will return to Step 1003. Finally, if there is not any slave unit addition or deletion, then a new unit having a higher priority index is added to the system. In this case, the new unit will be the new master unit and the current master unit will follow the procedure as shown in FIG. 11 and wake up as a slave unit.

FIG. 11 is a flow chart showing the steps in a wake up process for a slave unit according to the dynamic topology of the present invention. Step 1101 indicates the beginning of the slave unit wake up process. Then, the slave unit goes into a loop to determine whether the current master unit is still connected to the system. This determination as indicated in Step 1102 is performed every two seconds. When the slave unit detects the current master unit is removed from the system, the slave unit returns to point "1" of the bootup procedure as shown in FIG. 7. On the other hand, if the master unit is still present in the system, the slave system will continue this checking every two seconds. When the master unit is removed from the stacked switching system, a new determination is required among the remaining slave unit(s) to find out which one of them is the new master unit. In this case, all the remaining slave units will restart at point 1 of the flow chart as shown in FIG. 7. It should be noted that the slave unit also performs complementary steps (not shown in this flowchart) to the wake up process of the master unit as shown in FIG. 10. As stated in the previous paragraphs, these complementary steps include, but are not limited to, receiving and updating the firmware, receiving and updating the topology tables, receiving and maintaining the configuration data, and responding to any master unit commands, etc.

It is to be understood that while the invention has been described above in conjunction with preferred specific embodiments, the description and examples are intended to illustrate and not limit the scope of the invention, which is defined by the scope of the appended claims.

What is claimed is:

1. A method of operating a switch stack, comprising:

assigning a priority index to each switch of a set of switches, wherein each switch is configured to operate as a master switch;

connecting said set of switches to a network backplane;

assigning a master switch based on the priority index values after comparing priority index values of said set of switches, wherein the remaining switches operate as slave switches;

connecting to the network backplane a switch not included in the set of switches, the switch being configured to operate as a master switch;

assigning a priority index to the switch;

reassigning the first master switch as a slave when the priority index value of the first master switch is less than the priority index value of the switch; and assigning the switch as a second master switch when the priority index value of the first master switch is less than the priority index value of the switch, the connecting the switch, the reassigning the switch and the assigning the switch being performed without rebooting at least one of the switch and the set of switches.

2. The method of claim 1 further comprising downloading firmware from said master switch to said slave switches.

3. The method of claim 1 further comprising downloading a topology table to said slave switches.

4. The method of claim 1 further comprising defining configuration data within said master switch.

5. The method of claim 4 further comprising downloading said configuration data to said slave switches.

6. The method of claim 1 wherein assigning is performed after a switch stack topology change.

7. The method of claim 1, the master switch being a first master switch, the method further comprising:

assigning a switch from the set of switches as a second master switch when power to the first master switch is removed and the priority index value of the switch is not less than the priority index value of the remaining switches from the set of switches excluding the first master switch.

8. An apparatus, comprising:

a first switch configured to operate as a master switch and being associated with a priority value; and a second switch configured to operate as a slave switch and being associated with a priority value, the second switch being coupled to the first switch, the first switch being configured to be designated as a master switch and the second switch being configured to be designated as a slave switch when the priority value of the first switch is greater than the priority value of the second switch; and a third switch coupled to the first switch and the second switch, the third switch configured to operate as a master switch and being associated with a priority value, the third switch being configured to be designated as a master switch and the second switch being configured to be re-designated as a slave switch when the priority value of the first switch is greater than the priority value of the second switch;

at least one of the first switch, the second switch and the third switch is configured to change its designation from one of a master switch and a slave switch to the remaining designation without rebooting that switch.

9. The apparatus of claim 8, further comprising:

a network backplane, the first switch and the second switch being coupled to the network backplane.

10. The apparatus of claim 8, wherein:

the first switch is configured to receive the priority value associated with the second switch, the second switch is configured to receive the priority value associated with the first switch.

* * * * *